April 6, 1965     A. L. FACCOU     3,177,012
SWIVEL PIPE JOINT AND MEANS FOR PREVENTING FREEZING THEREOF
Filed April 4, 1960
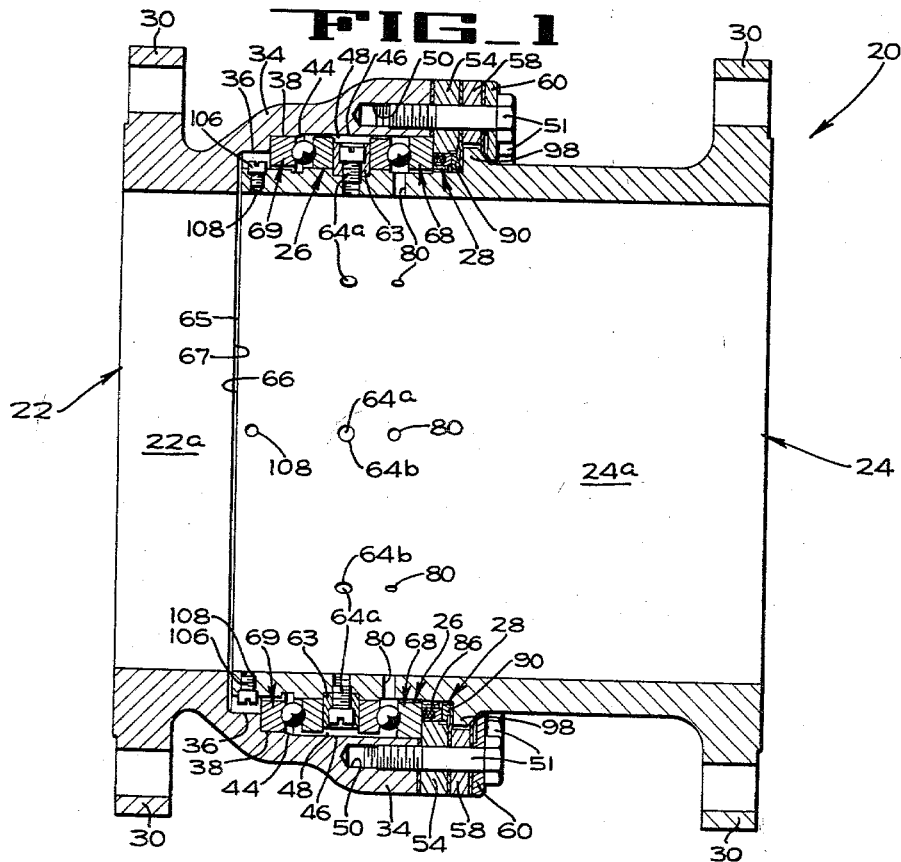
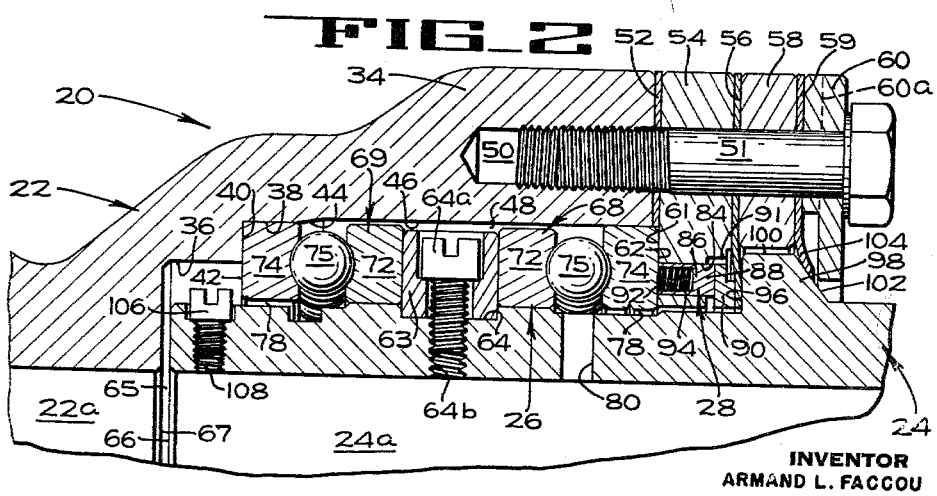
INVENTOR
ARMAND L. FACCOU
BY *Hans G. Hoffmeister*
ATTORNEY

United States Patent Office 3,177,012
Patented Apr. 6, 1965

3,177,012
SWIVEL PIPE JOINT AND MEANS FOR
PREVENTING FREEZING THEREOF
Armand L. Faccou, Santa Ana, Calif., assignor, by mesne assignments, to FMC Corporation, San Jose, Calif., a corporation of Delaware
Filed Apr. 4, 1960, Ser. No. 19,931
3 Claims. (Cl. 285—94)

The present invention pertains to swivel joints and more particularly relates to swivel pipe joints for handling fluids subject to extreme temperature variations.

More specifically, the swivel pipe joint of this invention is especially adapted to handle a liquified gas, such as oxygen, which may have a temperature in the order of 300 degrees (Fahrenheit) below zero, and is also especially adapted to handle other fluids at temperatures as high as 275 degrees above zero.

The usual swivel joint for conducting liquid at very low temperatures often becomes frozen and inoperative because the bearings that couple the relatively rotatable elements of the joint are exposed to air containing moisture which condenses thereon and freezes together parts of the bearings that should be relatively movable.

The present invention provides an improved swivel pipe joint which is particularly adapted for conducting an extremely low temperature liquid and in which means are provided to maintain the relatively movable elements of the joint free from frozen condensate.

Accordingly, an object of the present invention is to provide an improved swivel pipe joint for handling liquids at very low temperatures.

Another object is to provide a pipe swivel in which the bearings are maintained substantially at the temperature of the transmitted fluid.

Another object of this invention is to provide a seal assembly for a swivel pipe joint which is effective over a large range of temperatures.

Another object is to provide a swivel pipe joint for handling both high and low temperature fluids, which is adapted to act as a thrust bearing for axial forces imposed upon the swivel by the conduits it interconnects.

These and other objects and advantages of the present invention will become apparent from the following description and the accompanying drawing, in which:

FIGURE 1 is a longitudinal medial section of the swivel pipe joint of the present invention.

FIGURE 2 is a fragmentary enlarged detail of part of the seal and bearing used in the swivel joint illustrated in FIGURE 1.

The swivel pipe joint 20 of the present invention comprises a cylindrical female coupling member 22 within which a cylindrical male coupling member 24 is rotatably mounted by a ball bearing assembly 26. A compound sealing member 28 is provided for sealing between the relatively rotatable coupling members 22 and 24. It is to be noted that the sealing member 28 provides a fluid tight seal outwardly of the bearing 26 between the coupling members 22 and 24, but does not confine the liquid handled to the bore 22a of the female coupling member 22 and the bore 24a of the male coupling member 24, as will be later brought out in this description.

Each coupling member 22, 24 is provided with a pipe-connecting flange 30 which is bolted to a matching flange (not shown) on the end of one of the two liquid supply pipes to be rotatably interconnected by the swivel joint 20. In the usual manner, the bearing assembly 26 will allow relative rotation of the two coupling members 22, 24 while limiting relative axial movement and axial misalignment of the coupling members and their associated pipes of the flow line. Although the bearing assembly 26 is illustrated as a ball type bearing, other bearings may also be used, provided that the bearing has apertures equivalent to the spaces or passages between adjacent balls in order to allow fluid to pass through the perforate parts of the bearing. Thus a needle type bearing must have clearance space between adjacent rollers, and a sleeve type bearing must be apertured in order to function in the swivel 20.

The female coupling member 22 is provided with an enlarged bell end 34 which has a counterbore 36 (FIG. 2) of limited axial extent adjoining the bore 22a. A second counterbore 38 in the bell 34 forms a shoulder 40 between the counterbores 36 and 38, against which an inner end 42 of the bearing assembly 26 is seated. The cylindrical surface of the counterbore 38 extends axially a short distance toward the open end of the bell to a transition surface 44 which diverges into a third counterbore 46 that extends with a uniform diameter to the end of the bell. The counterbore 46 provides a circumferential flow passage 48 around the outer surface of a part of the bearing member 26 for a purpose which will be explained later.

The end of the bell 34 is provided with a plurality of circumferentially spaced threaded apertures 50 (two shown in FIG. 1) into each of which is screwed a bolt 51. The bolts 51 secure a thin deformable metal annular gasket 52 between the end of the bell 34 and the adjacent end surface of a spacer annulus 54, in order to provide a fluid tight seal between the bell and the spacer. Also secured to the bell 34 by the bolts 51 in the following order outward from the spacer annulus 54 are a resilient metal sealing annulus 56 that is disposed against the other end surface of the spacer 54, a second spacer annulus 58, a dust seal 59 and a split retaining ring 60. The split retaining ring 60 is provided with a plurality of radially extending drain notches 60a in its surface which contacts the dust seal 59, and which will be later mentioned.

The inner portion of the spacer annulus 54 provides a radial surface 61 which abuts an outer end 62 of the bearing assembly 26 in order to axially fix the bearing assembly 26 in the female coupling member 22 between the shoulder 40 and the spacer 54. Axial movement between the female and male coupling members 22 and 24 is prevented by means of a split spacer ring 63, which is disposed in a circumferential groove 64 in the male coupling member 24 and is locked thereto by a plurality of bolts 64a that are screwed into threaded apertures 64b. In this manner, the two coupling members 22, 24 are locked together by the bearing assembly 26 so as to restrict or substantially eliminate relative axial movement of the coupling member, and so as to maintain a radial clearance passage 65 between the inner end 66 of the male coupling member 24, and the bottom end wall 67 of the counterbore 36 in the female coupling member 22.

The bearing assembly 26 includes a ball bearing 68 disposed near the outer end of the bell, and a ball bearing 69 spaced from the bearing 64 by the split spacer ring 63. As is clearly shown in FIGURE 2, each ball bearing 68 and 69 contacts the male coupling member 24 only in the portion of the coupling member which abuts the inner surface of a ball race 72 of each bearing, and the confronting end surfaces of the two races 72 contact the split spacing ring 63. The surfaces of the male coupling member 24 which are opposite the inner surfaces of the other ball race 74 and balls 75 of each bearing, are of reduced diameter in order to form an annular flow passage 78 between the ball races 74 and the coupling 24, and between the balls 75 and the coupling. Additionally, a plurality of radially extending flow passages 80 are provided in the bore 24a of the coupling member 24 which allow part of the fluid conducted through the aligned bores 22a and 24a to flow through the passages 80 and be directed thereby to the bearing assembly 68, through the spaces between adjacent balls 75 of the bearing, and into the circumferential flow passage 48. Fluid also enters the annular passage 78 which is closer to the sealing annulus 28 and exerts hydrostatic pressure against the inner surface thereof so that it aids in energizing the seal.

The inner portion of the spacer annulus 54 (i.e. that portion which contacts the end 62 of the bearing assembly 26) is provided with a plurality of axially extending circumferentially spaced apertures 84, in each of which is a cylindrical plunger 86 slidably mounted. A closed end 88 of each plunger bears against one end surface of a pressure ring 90 which is disposed in an annular recess 91 of the spacer annulus 54. A recess 92 in the other end of each plunger contains a compression spring 94 which is held in compression between the closed end 88 and the end surface 62 of the bearing assembly 26. Abutting the opposite end surface of the pressure ring 90 is the inner circumferential portion of the resilient metal sealing annulus 56. The sealing annulus 56 is formed of thin metal and its inner portion yields under the pressure of the springs 94 so that it is held by the plungers 86 in firm sealing engagement with a smooth radial surface 96 of an annular flange 98 which is integrally formed on the exterior surface of the male coupling member 24.

In order to prevent extrusion of the sealing annulus 56 when high pressure fluid is directed against it, the inner circumferential surface of the spacer 58 is spaced but a short distance from a peripheral surface 100 of the flange 98. An inner edge portion 104 of the dust seal 59 engages the other radial wall 102 of the flange 98, which is of frusto-conical form. The dust seal 59 is formed of resilient metal, and the axial position in which it is secured in relation to the seal engaging surface 102 causes its inherent resiliency to keep its inner edge 104 firmly engaged upon the sloping wall 102. The dust seal 59 thus maintains a sliding contact with the wall 102 during relative rotation of the two coupling members 22 and 24, and precludes the entry of foreign matter into the coupling. The previously mentioned drain notches 60a in the split retaining ring 60 allow the rapid draining of any moisture which may collect between the dust seal 59 and the ring 60, in the area of the wall 102, when the temperature of the swivel joint 20 is above freezing.

If the temperature of the swivel joint 20 drops below freezing and rain or other moisture should form ice between the confronting surfaces of the inner portion 104 of the dust seal 59 and the retaining ring 60, the seal 59 will flex away from the ring 60, and thus allow for expansion of the frozen moisture. Moreover, flexing of the inner portion 104 of the dust seal tends to break up the ice and prevent the ring 60 from freezing to the dust seal 104 so that the seal may continue to function. The volume of frozen moisture which might collect between ring 60 and the flange 98 is kept small by close spacing of these parts so as to minimize whatever ice might form between them and resist relative movement therebetween. In addition, the angle formed by the adjacent surfaces of the wall 102, and the retaining ring 60 tend to cause the ice, as it expands, to automatically force itself out.

At this point it should be explained that although the split ring 60 functions as a retaining ring in the manner already explained, it has another important function in the swivel joint 20. One of the uses of the swivel joint of this invention is in supplying liquid fuel to a rocket. During firing of the rocket a large volume of very hot gases is exhausted, and during such firing, the ring 60 additionally functions as a flame deflector to prevent the hot gases from contacting the inner portion 104 of the dust seal 59 which would otherwise cause its rapid deterioration.

Assembly of the swivel joint 20 of the present invention is carried out as follows: Since the pipe connecting flange 30 prevents mounting the dust seal 59 on the male coupling member from that end of the coupling, the dust seal must be installed from the opposite end of the coupling member to be positioned adjacent the wall 102 of the flange 98. It will be seen that the internal diameter of the dust seal 59 is smaller than the external diameter of the flange 98. The dust seal nevertheless can easily be positioned adjacent the sloping wall 102 because it is flexible and can be moved over the flange 98 in much the same manner as an automobile tire is mounted on its wheel. Next, the spacer annulus 58 is positioned over the flange 98 and the sealing annulus 56 is placed on the male coupling member 24 in a position adjacent the radial surface 96 of the flange 98. The pressure ring 90 is then placed against the inner face of the sealing annulus 56, and the spacer annulus 54 with all of its plungers 86 and springs 94 mounted therein is placed against the sealing annulus and the pressure ring. The ball bearing 68 is fitted over the male coupling member 24 and the split retaining ring 63 is bolted to the coupling member 24 by the bolts 64a. The ball bearing 69 is then placed on the male coupling member 24 adjacent the split retaining ring 63. After this has been done, bolts 106 of which only three are shown, are screwed into threaded apertures 108 which are provided in the maple coupling member adjacent its terminal end, to prevent the assembled bearing from sliding off the male coupling member. The male coupling member and bearing can then be inserted as a unit into the female coupling member 22 and the remaining elements installed in the obvious manner.

It is to be noted that the bolts 106 purposely do not extend to the full depth of their threaded apertures 108 so that a turbulence in the fluid flowing through the aligned bores 22a and 24a will be created by the inner end portion of each aperture for a reason to be presently explained.

When the swivel joint 20 of the present invention is installed in a flow line and conducting a fluid through its aligned bores 22a and 24a, which flow may be in either direction, part of the fluid will enter the apertures 80 and the clearance space at 65 between the male and female coupling members. That portion of the fluid circulates through the passage 78, around the bearing races 74, through the spaces between adjacent balls 75 of the bearings 68 and 69, and in the annular flow passage 48. In this manner the bearing assembly 26 rapidly reaches a temperature very close to that of the fluid in the bores 22a and 24a.

If the fluid being handled by the swivel joint 20 is liquified oxygen, the temperature thereof may approximate 300 degrees below zero. If any air were present within the swivel joint 20, moisture would inevitably condense upon the cold interior surfaces of the swivel and quickly freeze, thus causing interference between the relatively rotatable interior parts of the swivel and impairing free movement thereof. However, there can be no possibility of the formation of condensate in the bearings or on any of the surrounding relatively movable parts of the swivel joint of this invention because the fluid circulates through and around each bearing 68 and 69 to maintain both bearings and said parts in a moving flow of liquid oxygen. Thus all air is positively excluded from within the swivel joint 20, with the result that condensation cannot occur therein, and the relatively movable parts of the swivel joint will not freeze together.

In regard to the circulation of the fluid around the bearings in either axial direction, it is to be especially noted that the fluid effectively lubricates the swivel. Circulation of the fluid is made positive by a flow turbulence created by the clearance passage 65 between the male and female coupling members and by the turbulence created due to the adjacent apertures 108 and 64b, and the flow passages 80, all of which present irregularities in the wall of the bore 24a of the male coupling member. As is well known in the hydraulic arts, turbulence existing at some point in an otherwise smooth flow passage will create a pressure differential between the turbulent area and the area of smooth flow. In the present invention, the pressure difference thus created causes a part of the fluid being handled to positively circulate through and around the bearing assembly 26.

As already mentioned, the pressure of the transmitted fluid is added to the force of the springs 94 which act against the pressure ring 90 to cause the sealing annulus 56 to seat against the surface 96. Therefore, the higher the pressure within the swivel joint 20, the more effective is the seal between the coupling members 22 and 24.

It is of particular importance that the construction of the bearing assembly 26 enables it to not only resist axial misalignment of the coupling and forces from the pressure of the fluid within the coupling which tend to separate the two coupling members, but will also permit the swivel joint 20 to function efficiently even when subjected to axial forces directed toward the coupling and in excess of any forces tending to separate the coupling members. In other words, the coupling 20 is peculiarly adapted to act as a thrust bearing and finds useful employment in installations in which the axis of the coupling is nearer vertical than horizontal, such as in the fueling of erected rockets using liquid propellants.

From the preceding description it will be seen that the swivel pipe joint of the present invention is especially useful in handling liquids at extremely low temperatures because it inhibits freezing of the joint. The swivel joint of the invention is effective for handling hot liquids, also, because the seal components are highly resistant to the effects of high temperatures. Since the fluid in the swivel joint bathes substantially all of the moving parts and thus lubricates them, it is not necessary to employ for the purpose grease which is incompatible with many liquified gases. There are, however, several types of dry lubricants which are not adversely affected by liquified gases and may be used to assist in lubricating the swivel joint 20. For instance, the sealing annulus 56 may be coated with molybdenum disulphide to reduce friction and prevent galling where it slides against the radial surface 96 of the flange 98. Similarly, the inner edge portion 104 of the dust seal 59 may be coated with a dry lubricant to prevent its galling and to reduce its friction against the sloping wall 102 of the flange 98. Alternatively, there are available plastic compounds which may be satisfactorily used in place of the sealing annuli 56 and 59, or incorporated with metal annuli. Two of these plastics are the well known "KEL-F" and "Teflon."

The swivel joint of the invention is therefore particularly adapted to handle fluids which will react adversely upon grease or organic seals and thus has particular utility in handling many liquified gases.

It will be understood that certain modifications and variations may be resorted to without departing from the spirit of the invention or the scope of the appended claims. For instance, the circulation of part of the fluid from the aligned bores 22a and 24a to the bearing 26 and the adjacent surfaces of the coupling members 22 and 24, might be by means of flow passages providing communication between the bore 22a, the annular passage 48 and the passages 80. The radial passage 65 between the confronting end surfaces 66 and 67 of the coupling members 24 and 22, respectively, might then be kept sealed or otherwise obstructed, as by a bearing, and yet the freezeproof features of the swivel would remain. Other modifications and variations of the present invention will be apparent to those persons skilled in the art.

Having thus described the present invention, that which I claim as new and desire to protect by Letters Patent is:

1. A swivel pipe joint for rotatably interconnecting two axially aligned conduits for carrying low temperature fluids, comprising a female coupling member having an enlarged housing adjacent one end, an outwardly facing abutment surface at the inner end of said housing, a male coupling member projecting into said housing with its end surface adjacent but spaced from said abutment surface to form a radial passage that interrupts the smooth otherwise continuous bore surfaces of the male and female coupling members, bearing means in said housing interconnecting said coupling members for relative rotation, a sealing ring interposed between said coupling members externally of said bearing means for preventing leakage of fluid between said members, a plurality of radial ports in said male coupling member adjacent the outermost portion of said bearing means providing communication between the interior of said male coupling member and said sealing ring in the interior of said housing to bias said ring into sealing engagement with said male coupling member, means defining axial passageways in said housing providing fluid communication between said radial ports and the radial passage between the end of said male coupling member and said abutment surface, whereby turbulence in the vicinity of the end of said male coupling member causes a pressure drop adjacent said radial passage thus establishing fluid flow from the bores through said radial ports, through said axial passageways in said housing, and back to the bores via said radial passage to prevent condenstion within said housing.

2. A swivel pipe joint for carrying sub-zero liquids which are gaseous at above zero temperature and atmospheric pressure, comprising a female coupling having an axial bore, a radial wall projecting outward from said bore, and an internal wall projecting endwardly from adjacent to said radial wall; a male coupling fitted within said female coupling and having an axial bore in alignment with the bore of the female coupling, a radial end wall spaced from and facing said radial wall of the female coupling, an external wall extending from said end wall to a radial flange on the male coupling; means rotatably interconnecting said couplings; bearing means encircling said male coupling and located inwardly of said flange between said internal and external walls, said bearing means having axially spaced raceway means one of which is circumferentially spaced from said internal wall and the other of which is circumferentially spaced from said external wall; and balls between and rollably engaging said raceway means; and sealing means between said flange and said bearing means for maintaining a liquid-tight seal while accommodating relative rotation between said couplings, there being a liquid passageway from said bores between said radial walls, through the spaces between said raceway means and the internal and external walls and between the balls to said sealing means, said male member having a port adjacent the sealing means establishing liquid communication between said bores and said passageway for admitting liquid into said passageway in order to exclude water vapor therefrom, to lubricate said bearings, and to exert pressure on said sealing means.

3. A swivel pipe joint for carrying sub-zero liquids which are gaseous at above zero temperature and atmospheric pressure, comprising a female coupling having an axial bore, a radial wall projecting outward from said bore, an inner counter-bore projecting axially from said radial wall, a shoulder radiating outward from said inner counter-bore and an internal wall projecting from said shoulder to the exterior of said female coupling; a male coupling fitted within said female coupling and having an axial bore in alignment with the bore of the female coupling, a radial end wall spaced from and facing said radial wall of the female coupling, an external wall extending from said end wall to a radial flange on the male coupling and outside of the female coupling; means rotatably interconnecting said couplings; axially spaced inner and outer bearings encircling said male coupling, said inner bearing including an inner race against said shoulder and spaced from said external wall, an outer race spaced from said internal wall, and balls between and rollably engaging said races, said outer bearing including an inner race spaced from said internal wall, an outer race spaced from said external wall and axially spaced from said flange, and balls between and rollably engaging said inner and outer races of the outer bearing; and sealing means between said flange and the outer race of the outer bearing for maintaining a liquid-tight seal while accommodating relative rotation between said couplings, there being a liquid passageway from said bores between said radial walls, through said inner counter-bore, between said external wall and the inner race of the inner bearing, between the balls of the inner bearing, between the outer race of the inner bearing and said internal wall, between the inner race of the outer bearing and said internal wall, between the balls of the outer bearing, and between the outer race of the outer bearing and said external wall to said sealing means, said male member having a port adjacent the sealing means establishing liquid communication between said bores and said passageway for admitting liquid into said passageway in order to exclude water vapor therefrom, to lubricate said bearings, and to exert pressure on said sealing means.

References Cited by the Examiner

UNITED STATES PATENTS

| | | | |
|---|---|---|---|
| 2,061,198 | 11/36 | Kohut | 285—41 |
| 2,270,928 | 1/42 | Browne | 285—276 |
| 2,356,351 | 8/44 | Phillips | 285—276 |
| 2,444,401 | 6/48 | Gartz | 137—339 |
| 2,473,061 | 6/49 | Jacobsen | 285—281 |
| 2,533,421 | 12/50 | Bodnar | 285—279 |
| 2,694,404 | 11/54 | Luft | 137—1 |
| 2,748,666 | 6/56 | Forrest | 137—1 |
| 2,766,065 | 10/56 | Joyslen | 285—278 |
| 2,770,475 | 11/56 | Rafferty | 285—281 |
| 2,861,780 | 11/58 | Butler | 308—76 |
| 2,910,309 | 10/59 | Snyder | 285—41 |
| 2,927,805 | 3/60 | Faccou | 285—375 |
| 2,986,877 | 6/61 | Emmons | 285—41 |

FOREIGN PATENTS

| | | |
|---|---|---|
| 655,265 | 1/38 | Germany. |
| 1,057,838 | 5/59 | Germany. |
| 310,121 | 4/29 | Great Britain. |
| 771,262 | 3/57 | Great Britain. |

CARL W. TOMLIN, *Primary Examiner.*